(12) United States Patent
Gavin

(10) Patent No.: US 9,435,435 B2
(45) Date of Patent: Sep. 6, 2016

(54) UNIVERSAL SECONDARY SAFETY SYSTEM INCLUDING A RISER AND SCREEN

(71) Applicant: Polylok, Inc., Wallingford, CT (US)

(72) Inventor: Peter W. Gavin, Durham, CT (US)

(73) Assignee: Polylok, Inc., Wallingford, CT (US)

( * ) Notice: Subject to any disclaimer, the term of this patent is extended or adjusted under 35 U.S.C. 154(b) by 0 days.

(21) Appl. No.: 14/532,441

(22) Filed: Nov. 4, 2014

(65) Prior Publication Data

US 2016/0122126 A1 May 5, 2016

(51) Int. Cl.
| | |
|---|---|
| *E04B 1/00* | (2006.01) |
| *E04H 1/00* | (2006.01) |
| *E02B 11/00* | (2006.01) |
| *B65D 90/54* | (2006.01) |
| *B65D 90/10* | (2006.01) |
| *F16J 13/06* | (2006.01) |
| *E03F 5/00* | (2006.01) |
| *E06B 9/00* | (2006.01) |
| *E06B 9/01* | (2006.01) |

(52) U.S. Cl.
CPC ............... *F16J 13/065* (2013.01); *E03F 5/00* (2013.01); *E06B 2009/002* (2013.01); *E06B 2009/015* (2013.01)

(58) Field of Classification Search
CPC ...... B65D 90/54; B65D 90/20; B65D 90/10; B65D 2213/00; F16J 13/065; E06B 2009/002; E06B 2009/015
See application file for complete search history.

(56) References Cited

U.S. PATENT DOCUMENTS

| | | | | |
|---|---|---|---|---|
| 2,287,427 A | * | 6/1942 | Degenhardt | C02F 3/02 110/203 |
| 3,077,842 A | * | 2/1963 | Reed | C02F 1/24 110/258 |
| 3,538,661 A | * | 11/1970 | Nelson | F17C 3/022 220/560.05 |
| 5,095,667 A | * | 3/1992 | Ryan | E02D 29/1409 285/42 |
| 5,297,895 A | * | 3/1994 | Johnson | E02B 11/00 405/37 |
| 5,618,416 A | * | 4/1997 | Haefner | E04D 13/0409 210/163 |
| 5,628,152 A | * | 5/1997 | Bowman | B65D 90/105 137/364 |
| 5,733,444 A | * | 3/1998 | Johnson | E03F 5/0401 210/163 |
| 5,827,007 A | * | 10/1998 | Barton | E02D 29/12 404/25 |

(Continued)

*Primary Examiner* — Mark Wendell
*Assistant Examiner* — Keith Minter
(74) *Attorney, Agent, or Firm* — Murtha Cullina LLP; Anthony P. Gangemi

(57) ABSTRACT

Systems for providing universally installable secondary safety systems for use, in one embodiment, with a riser for a septic tank are disclosed. In some embodiments, the system includes the following: a riser extending from a system of interest located underground, a retainer ring installed within said riser, and a safety screen to prevent access to the underground system and lower portions of the riser from above.

1 Claim, 5 Drawing Sheets

(56) References Cited

U.S. PATENT DOCUMENTS

| | | | | |
|---|---|---|---|---|
| 5,852,901 A * | 12/1998 | Meyers | ............... | E02D 29/12 220/4.26 |
| 6,050,500 A * | 4/2000 | Ensworth | ............ | B05B 15/068 239/201 |
| 6,286,730 B1 * | 9/2001 | Amidzich | ............ | B67D 1/0802 137/212 |
| 6,416,674 B1 * | 7/2002 | Singleton | ............... | E03F 5/105 210/163 |
| 6,484,451 B1 * | 11/2002 | Gavin | ............... | E02D 29/12 220/4.03 |
| 6,655,093 B1 * | 12/2003 | Gavin | ............... | E02D 29/12 220/4.26 |
| 6,877,281 B1 * | 4/2005 | Gavin | ............... | E02D 29/12 249/1 |
| 6,915,612 B2 * | 7/2005 | Oakley | ............... | E04F 17/06 52/107 |
| 7,171,994 B1 * | 2/2007 | O'Brien | ............... | B65D 90/24 141/311 A |
| 7,225,587 B2 * | 6/2007 | Shinehouse | ............ | E03F 11/00 52/19 |
| 7,303,357 B2 * | 12/2007 | Villarreal | ............ | E03F 5/0401 220/567.1 |
| 7,334,608 B1 * | 2/2008 | McCartney | ............... | E03F 3/02 138/89 |
| 7,347,644 B2 * | 3/2008 | Meyers | ............... | E02D 29/12 404/25 |
| 7,451,570 B1 * | 11/2008 | Gavin | ............... | E02D 29/14 52/19 |
| 7,627,992 B1 * | 12/2009 | Gavin | ............... | E02D 29/12 174/39 |
| 7,770,333 B2 * | 8/2010 | Meyers | ............... | F16L 41/08 220/4.03 |
| 7,926,510 B1 * | 4/2011 | Terry, III | ............... | E03F 11/00 137/363 |
| 7,966,786 B2 * | 6/2011 | Koteskey | ............... | E02D 29/12 220/4.04 |
| 8,277,646 B2 * | 10/2012 | Singleton | ............... | C02F 1/004 210/163 |
| 8,557,109 B1 * | 10/2013 | Sutherland | ............ | E03F 5/0404 210/163 |
| 8,834,714 B2 * | 9/2014 | Chien | ............... | E03F 1/00 210/163 |
| 2002/0079652 A1 * | 6/2002 | Nicolia | ............... | H02G 9/06 277/602 |
| 2002/0166291 A1 * | 11/2002 | Campbell | ............... | E02D 29/14 52/20 |
| 2003/0024176 A1 * | 2/2003 | Kanechika | ............ | E02D 27/32 52/169.7 |
| 2003/0145527 A1 * | 8/2003 | Meyers | ............... | E02D 29/12 52/20 |
| 2004/0071508 A1 * | 4/2004 | Nadasde | ............ | E02D 29/1445 404/26 |
| 2006/0283971 A1 * | 12/2006 | Hunter | ............... | B65D 25/16 239/16 |
| 2006/0283976 A1 * | 12/2006 | Wlodarczyk | ............ | B05B 15/10 239/205 |
| 2010/0219185 A1 * | 9/2010 | Griffin | ............... | F16J 13/065 220/4.07 |
| 2010/0276424 A1 * | 11/2010 | Ross | ............... | B65D 90/105 220/320 |
| 2013/0081256 A1 * | 4/2013 | Richiuso | ............... | F16J 13/065 29/525.08 |
| 2014/0252123 A1 * | 9/2014 | Anuskiewicz | ............ | B05B 15/10 239/205 |
| 2015/0107205 A1 * | 4/2015 | Hartog | ............... | B01D 29/52 55/502 |

* cited by examiner

UNIVERSAL SECONDARY SAFETY SYSTEM INCLUDING A RISER AND SCREEN

BACKGROUND

An essential component of subterranean system maintenance is visual inspection. As such, the buried components of these systems are often located beneath tunnels or passages capped by manholes or other coverings to prevent access to the tunnels and passages and therefore to the systems themselves by unauthorized persons or animals. In the past, these tunnels or passages, hereinafter referred to as "risers", were tubular shaped recesses formed from one or more segments of poured concrete. Likewise, poured concrete was often used to fashion the coverings, such as a lid or cover or cap, of the riser. However, use of concrete as the material for making risers can be expensive. Further, exposure to freeze-thaw and other natural forces over times periods of several years can cause the concrete to weaken and ultimately fail.

The durability, reduced weight, and decreased cost associated with plastics have enabled traditional concrete risers to be advantageously replaced with modern plastic ones. However, one drawback of the decreased weight associated with modern plastic risers is the concern that the lighter lids are more easily manipulated and removed by children and small animals. The danger that children and/or small animals might fall in and/or become trapped is a real concern with unsealed risers.

What is desired, therefore, is a secondary safety system for preventing entry into a riser in the event that the cap or lid of the riser becomes damaged and/or dislodged. Additionally, because riser sizes are not standardized and vary greatly in size, it is desired that a secondary safety system be capable of installation within a range of risers.

SUMMARY

In some embodiments, the present disclosure is directed to a universal secondary safety system comprising a riser joined with and extending vertically upward from a subterranean system, such as a septic tank system. In some embodiments, the universal secondary safety system comprises an expandable retainer ring including top and side surfaces and first and second ends, wherein the side surface joins with interior walls of the riser and includes one or more pre-drilled holes sized to receive fasteners for fastening the expandable retainer ring to interior walls of a riser. In some embodiments, an adjustable ratchet mechanism is included on the expandable retainer ring for increasing and decreasing a diameter of the expandable retainer ring and releasably joining the first and second ends. In some embodiments, the adjustable ratchet mechanism allows the diameter of the retainer ring to increase by about at least about 1% to about 10%.

Is some embodiments, a safety screen is positioned on and joined with the top surface of the expandable retainer ring. In some embodiments, the safety screen includes one or more holes sized to receive fasteners for fastening the safety screen to the top surface. In some embodiments, the safety screen has an upper surface that is generally convex.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
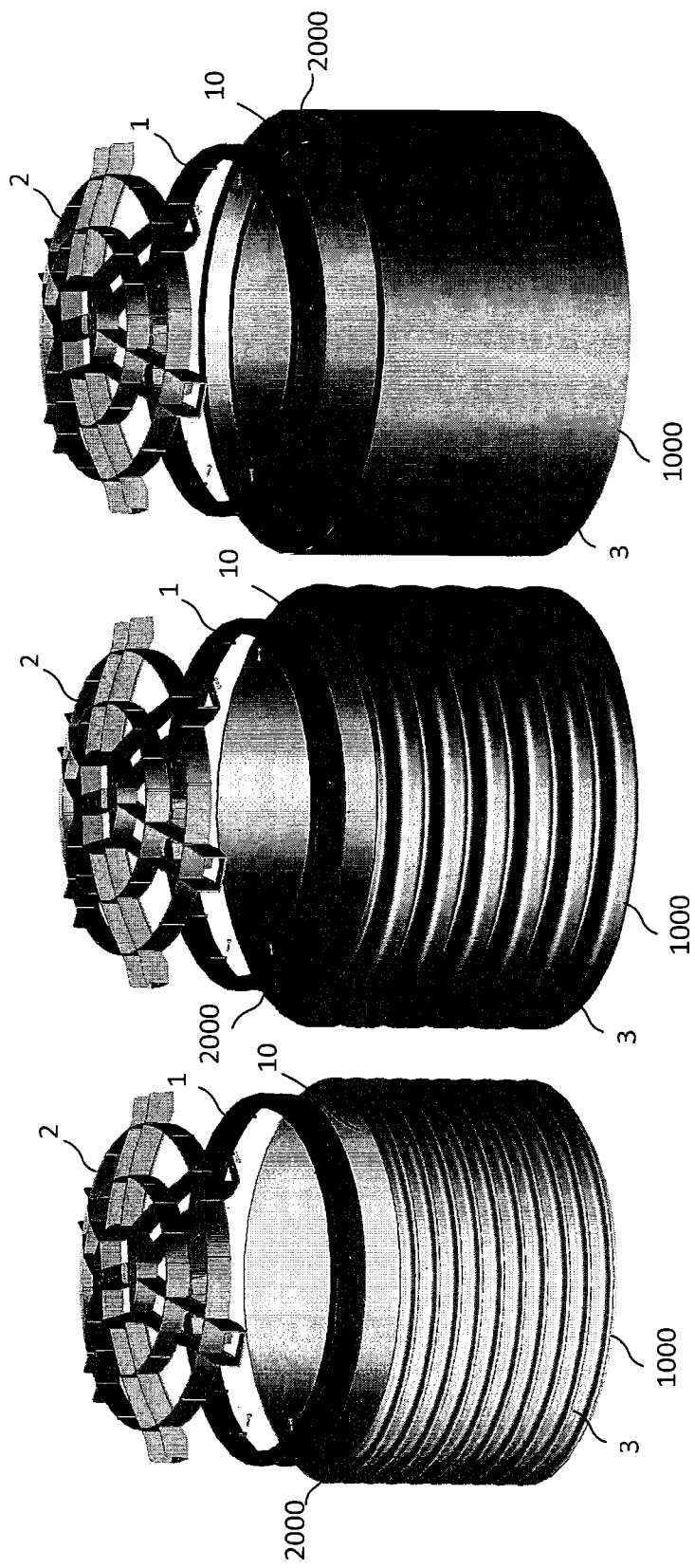
FIG. 1 is an isometric view of the universal secondary safety system according to some embodiments of the disclosed subject matter.
Figure 2A:
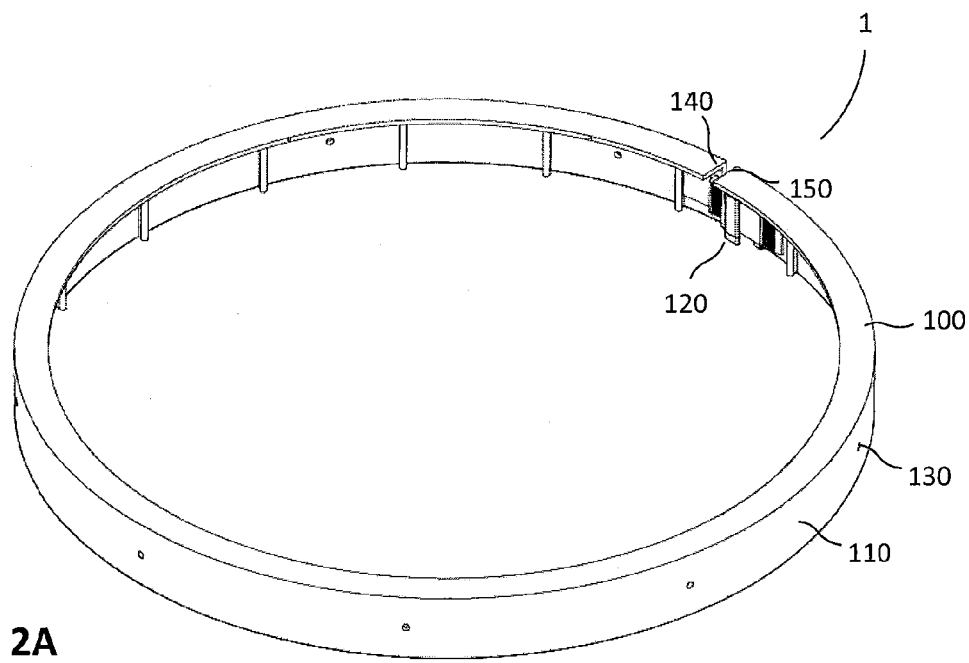
FIG. 2A is an isometric view of an embodiment of an expandable retainer ring as shown in FIG. 1.
Figure 2B:
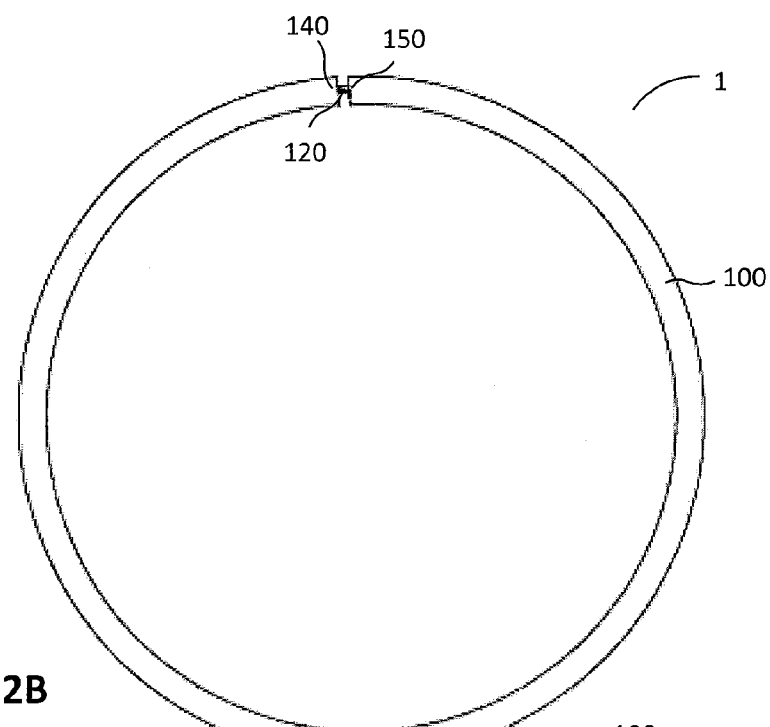
FIG. 2B is a top view of an embodiment of an expandable retainer ring as shown in FIG. 1.
Figure 2C:
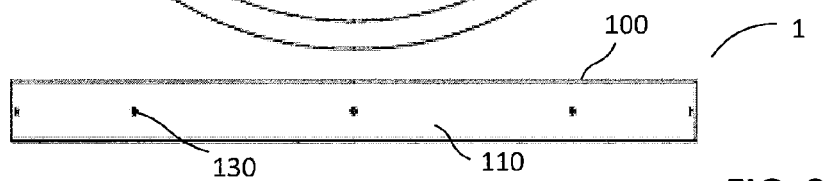
FIG. 2C is a bottom view of an embodiment of an expandable retainer ring as shown in FIG. 1.
Figure 2D:
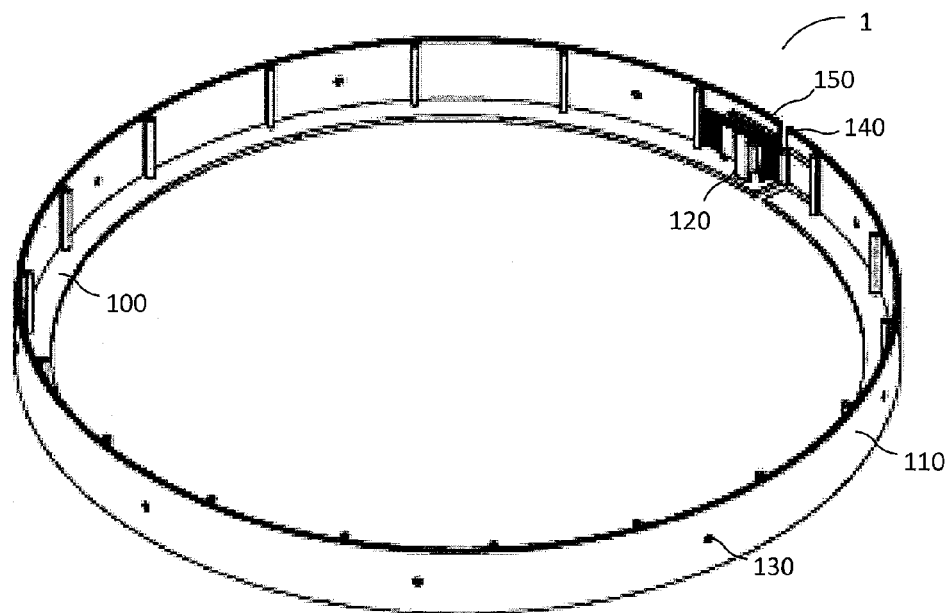
FIG. 2D is a bottom view of an embodiment of an expandable retainer ring as shown in FIG. 1.

Referring now to FIGS. 1-2D, some embodiments of the universal secondary safety system of the present disclosure include a retainer ring 1 and a safety screen 2 for preventing accidental entry to a riser 3. In some embodiments, riser 3 is for use with a septic tank system (not pictured) and allows a user clear access to the desired area of the septic tank system without the need to excavate the earth around the septic tank system. In some embodiments riser 3 is fastened to the desired area of the septic tank system at a first end 1000 and extends to the surface or ground level at a second end 2000. In some embodiments, riser 3 is enclosed through installation of a lid or capping device at second end 2000. Riser 3 and its accompanying lid or capping device can be fabricated from any suitable material and be of any suitable size. Preferably, riser 3 is fabricated from at least one of concrete and a plastic, such as polyvinyl chloride and high-density polyethylene.

Still referring to FIGS. 1-2D, in some embodiments, retainer ring 1 includes a top surface 100 and a side surface 110. In some embodiments, side surface 110 is configured to be joined with interior walls 10 of riser 3. In some embodiments, safety screen 2 is positioned on and joined with top surface 100 of retainer ring 1. In some embodiments, retainer ring 1 and safety screen 2 are installed between first end 1000 and second end 2000.

Figure 3:
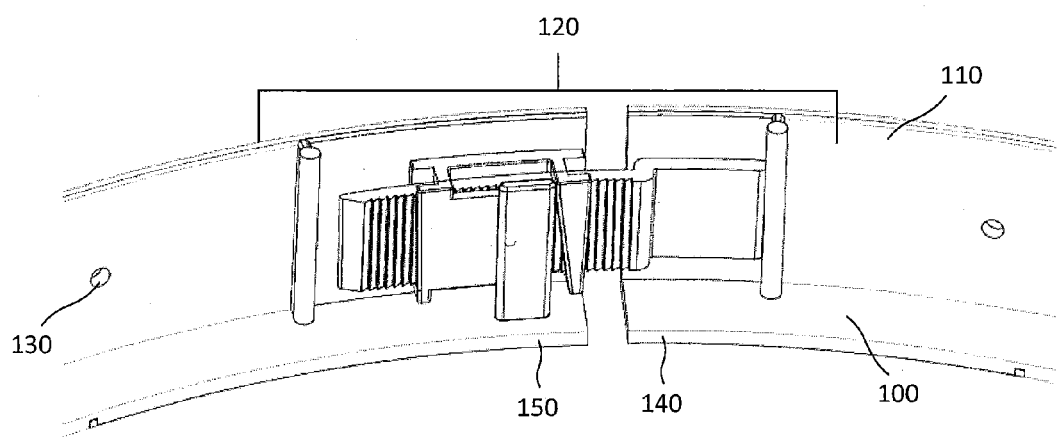
FIG. 3 is an enlarged view of an adjustable ratchet mechanism from an embodiment of an expandable retainer ring as shown in FIG. 1.

Referring now to FIG. 3, in some embodiments, retainer ring 1 includes a first end 140 and a second end 150. In some embodiments, first end 140 and second end 150 are connected through the use of an adjustable ratchet mechanism 120. In some embodiments, adjustable ratchet mechanism 120 is capable of increasing and decreasing the diameter of retainer ring 1. Thus, retainer ring 1 is expandable and can be adjusted to fit a wide range of riser sizes. In some embodiments, the connection between first end 140 and second end 150 provided by adjustable ratchet mechanism 120 is releasable. In some embodiments, the connection between first end 140 and second end 150 provided by adjustable ratchet mechanism 120 prevents complete separation of the ends, in other words the ratchet mechanism remains engaged. In some embodiments, the ratchet mechanism 120 is biased against contraction of the diameter of retainer ring 1. Thus, adjustable ratchet mechanism 120 prevents retainer ring 1 from contracting in response to radially applied forces and guard against deformation of retainer ring 1 which might lead to components of the universal secondary safety system falling through riser 3 towards the subterranean system at first end 1000. In some embodiments, adjustable ratchet mechanism 120 allows the diameter of retainer ring 1 to increase by at least about 1% to about 10%.

Referring again to FIGS. 2-2D, in some embodiments, side surface 110 of retainer ring 1 includes one or more pre-drilled holes 130 sized to receive fasteners for fastening retainer ring 1 to interior walls 10 of riser 3. Retainer ring 10 may be installed at any position along the length of interior wall 10 of riser 3. In some embodiments, retainer ring 1 is installed near second end 2000 of riser 3, opposite the end which interfaces with the subterranean system. In some embodiments, the fasteners are screws, such as those of any suitable size made from stainless steel. In some embodiments, the fasteners are stud anchors or wedge anchors. In some embodiments, at least 9 fasteners are provided at approximately equally spaced distances about the circumference of retainer ring 1.

Figure 4:
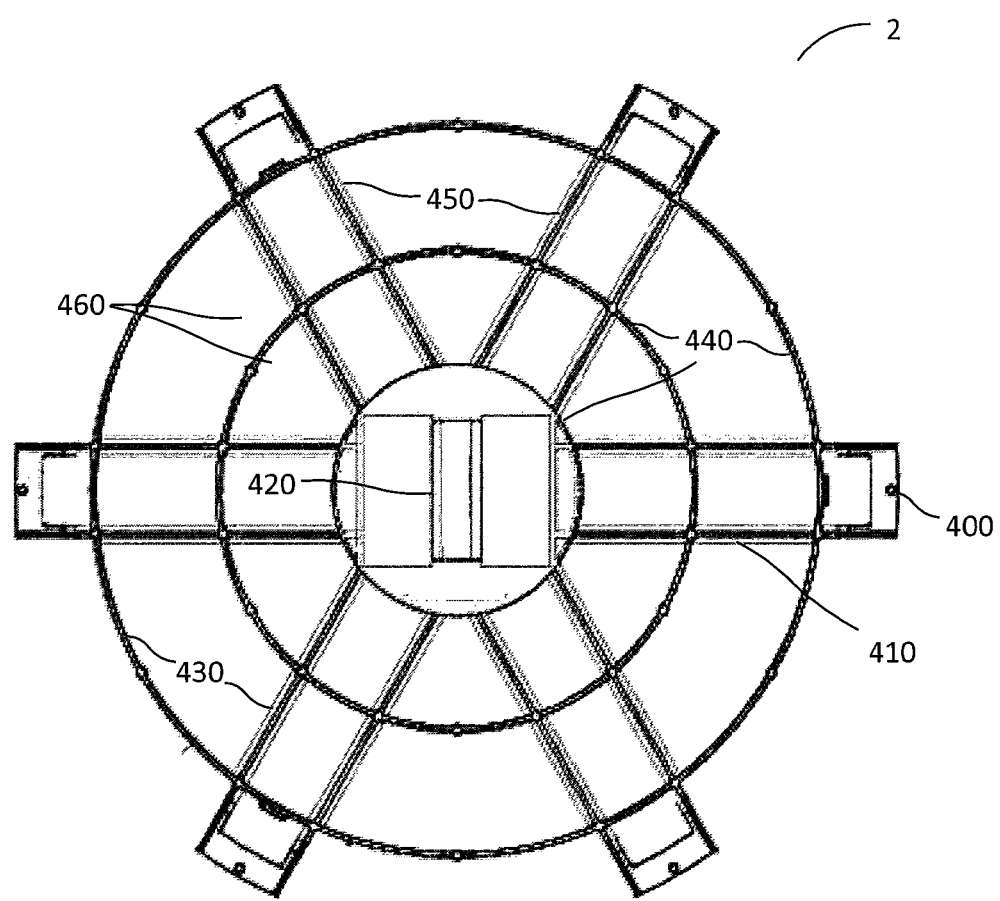
FIG. 4 is a top view of an embodiment of a safety screen as shown in FIG. 1.
Figure 5:
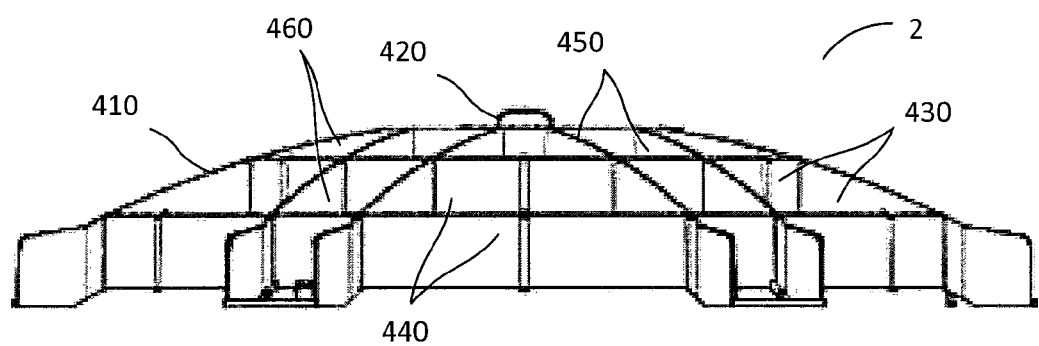
FIG. 5 is a side view of an embodiment of a safety screen as shown in FIG. 1.

Referring now to FIGS. 4-5, safety screen 2 is substantially sized and shaped to interface with top surface 100 of retainer ring 1. In some embodiments, safety screen 2 is shaped to generally mimic the shape of interior walls 10 and/or retainer ring 1. In some embodiments, safety screen 2 is substantially circular and made from supporting members 430, namely a series of concentric rings 440 intersecting with radially positioned ribs 450. In some embodiments, safety screen 2 includes a plurality of openings 460 positioned between radially positioned ribs 450 and concentric rings 440, which allow gases, liquids, and small solids to pass through the safety screen while substantially preventing pass-through of larger solids such as animals and humans. The specific shape, size, and placement of the supporting members 430 of safety screen 2 are a matter of design choice and well within capabilities of one having ordinary skill in the art. In some embodiments, upper surface 410 of safety screen 2 is generally convex, in other words upper surface 410 faces away from retainer ring 1 and the subterranean system. Thusly, safety screen 2 is positioned to best accept a load applied to it from above, such as when an animal or child falls into or attempts to gain access to riser 3. Such an arrangement is highly advantageous, leading to increased durability and strength of safety screen 2. Further, the cross-hatched design limits weight and production costs. In some embodiments, safety screen 2 comprises a handle 420.

In some embodiments, safety screen 2 includes one or more holes 400 sized to receive fasteners for fastening safety screen 2 to top surface 100. In some embodiments, safety screen 2 is attached to top surface 100 through 1 or more screws through one or more holes 400. In some embodiments, safety screen is not fastened to top surface 100, being only held in place by gravitational forces and interior walls 10.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A septic tank riser safety system for preventing accidental entry to a riser joined with and extending away from a septic tank, comprising:
    an expandable retainer ring including top and exterior side surfaces and first and second ends, said exterior side surface joined with interior walls of said riser;
    a safety screen positioned on and joined with said top surface of said expandable retainer ring wherein said safety screen includes one or more holes sized to receive fasteners for fastening said safety screen to said top surface, said safety screen having an upper surface that is generally convex;
    an adjustable ratchet mechanism included on said expandable retainer ring for increasing and decreasing a diameter of said expandable retainer ring and releasably joining said first and second ends; and
    wherein said exterior side surface of said expandable retainer ring includes one or more pre-drilled holes sized to receive fasteners for fastening said expandable retainer ring to interior walls of a riser; and
    wherein said adjustable ratchet mechanism allows the diameter of the retainer ring to increase by about at least about 1% to about 10%.

\* \* \* \* \*